United States Patent
Choi et al.

(10) Patent No.: US 8,981,768 B2
(45) Date of Patent: Mar. 17, 2015

(54) DEVICE FOR MEASURING BENDING ANGLE OF CONSTANT VELOCITY JOINT OF DRIVE SHAFT

(75) Inventors: Won Jun Choi, Incheon (KR); Yong Joo Kim, Seoul (KR); Jang Ho Kim, Hwaseong-si (KR); Seong Ki Ha, Busan (KR)

(73) Assignee: Hyundai Motor Company, Seoul (KR)

( * ) Notice: Subject to any disclaimer, the term of this patent is extended or adjusted under 35 U.S.C. 154(b) by 224 days.

(21) Appl. No.: 13/472,107

(22) Filed: May 15, 2012

(65) Prior Publication Data

US 2013/0154625 A1    Jun. 20, 2013

(30) Foreign Application Priority Data

Dec. 14, 2011    (KR) .......................... 10-2011-0134799

(51) Int. Cl.
*G01B 7/30* (2006.01)
*F16D 3/223* (2011.01)

(52) U.S. Cl.
CPC ............ *F16D 3/223* (2013.01); *F16D 2300/18* (2013.01); *G01B 7/30* (2013.01)
USPC ................................... 324/207.25; 324/207.2

(58) Field of Classification Search
USPC ................ 324/207.2, 207.21, 207.25, 207.26
See application file for complete search history.

(56) References Cited

U.S. PATENT DOCUMENTS

| | | | |
|---|---|---|---|
| 3,530,317 A * | 9/1970 | Lang ................................ 310/10 |
| 5,712,478 A * | 1/1998 | Olsson ...................... 250/231.13 |
| 7,170,285 B2 * | 1/2007 | Spratte ...................... 324/207.25 |
| 7,405,557 B2 * | 7/2008 | Spratte et al. ............ 324/207.22 |
| 7,695,212 B2 * | 4/2010 | Spratte et al. .................. 403/135 |
| 7,914,024 B2 * | 3/2011 | Lohmuller et al. ......... 280/124.1 |
| 8,531,182 B2 * | 9/2013 | Banerjee ................... 324/207.25 |
| 2002/0171416 A1 * | 11/2002 | Schroeder ................ 324/207.21 |
| 2004/0100357 A1 * | 5/2004 | Kruse ............................ 338/128 |
| 2006/0078369 A1 * | 4/2006 | Spratte ........................... 403/122 |
| 2009/0051135 A1 | 2/2009 | Lohmuller et al. |
| 2012/0025809 A1 * | 2/2012 | Banerjee et al. ............ 324/207.2 |
| 2012/0176126 A1 * | 7/2012 | Naganuma et al. ...... 324/207.25 |

FOREIGN PATENT DOCUMENTS

| | | |
|---|---|---|
| JP | 2007-502944 A | 2/2007 |
| JP | 2007-163432 A | 6/2007 |
| KR | 10-0686437 B1 | 2/2007 |
| KR | 10-2008-0051535 A | 6/2008 |

* cited by examiner

*Primary Examiner* — Jay Patidar

(74) *Attorney, Agent, or Firm* — Morgan, Lewis & Bockius LLP

(57) ABSTRACT

Provided is a device for measuring a bending angle of a constant velocity joint of a drive shaft, the device including an outer race provided at a drive shaft and having an opening part formed at one end thereof, a permanent magnet mounted in the opening part of the outer race, and a sensor provided on an outer peripheral surface of the drive shaft and interlocking with the permanent magnet to measure a bending angle between the drive shaft and the outer race. Therefore, a size and a direction of the bending angle between the drive shaft and the outer race may be measured, thereby making it possible to improve marketability and stability of a vehicle.

3 Claims, 8 Drawing Sheets (a)

(b)

DEVICE FOR MEASURING BENDING ANGLE OF CONSTANT VELOCITY JOINT OF DRIVE SHAFT

CROSS-REFERENCE TO RELATED APPLICATION

The present application claims priority to Korean Patent Application No. 10-2011-0134799, filed on Dec. 14, 2011 in the Korean Intellectual Property Office, the entire contents of which is incorporated herein for all purposes by this reference.

BACKGROUND OF THE INVENTION

1. Field of the Invention

The present invention relates to a device for measuring a bending angle of a constant velocity joint of a drive shaft, and more particularly, to a device for measuring a bending angle of a constant velocity joint of a drive shaft for a vehicle.

2. Description of Related Art

In general, a driving component, which is a device transferring power generated in a powertrain to a wheel or a differential, includes a transmission and a joint provided at the wheel/differential side. Particularly, a constant velocity joint is used at the wheel/differential side in order to reflect a bending angle at the time of steering to transfer power.

At the time of damage of the driving component which is a main component associated with safety, driving force may not be transferred, and the powertrain/differential may be damaged. Strength of this driving component is determined by a size of the joint included in the shaft. In this joint, a difference in strength allowed according to a bending angle is large.

Although an allowable limit angle of the constant velocity joint is generally estimated to be 43.5 degrees, in the case of a joint that has been recently developed, strength is secured even at a bending angle of 43.5 degrees or more. However, an additional cost is required, and strength becomes poor as a bending angle increases, similar to an existing joint.

As shown in FIGS. 1 and 2, in the case of a drive shaft according to the related art, a wheel-side joint serves to transfer driving force of a powertrain even in a state in which it is bent while a ball 11 therein rolls in an outer wheel 10, according to a turning radius of a tire at the time of steering.

Here, a bending angle means a degree in which the ball joint side 1 is bent based on an axis of the outer wheel 10 as compared to a state in which the wheel is neutral. As the bending angle increases, strength and durability decrease.

Recently, since damage of a joint due to excessive handle steering such as backward movement stall and an excessive bending angle generated under severe driving conditions is actually generated frequently, accurate measurement for a maximum bending angle has been prominent unlike the past.

To this end, the bending angle is measured by a method of connecting a thread to an outer side of a constant velocity joint to measure displacement. However, this method has a problem that accuracy is low. In addition, a method of measuring displacement using a variable resistor is also used. However, this method has problems that an additional time and cost are required to install a measuring device and it is difficult to install the measuring device due to a package problem of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for measuring a bending angle of a constant velocity joint of a drive shaft for a vehicle.

In an aspect of the present invention, a device for measuring a bending angle of a constant velocity joint of a drive shaft, may include an outer race provided at the drive shaft and having an opening part formed at one end thereof to receive an end of the drive shaft therein, a permanent magnet mounted to the outer race in the opening part thereof, and a sensor provided on an outer peripheral surface of the drive shaft and interlocking with the permanent magnet to measure the bending angle between the drive shaft and the outer race.

The sensor is provided in plural.

The device may further include a controller connected to the sensor to analyze a size and a direction of the bending angle between the drive shaft and the outer race measured through the sensor.

The permanent magnet may have a distal end with a curved shape to may have an angle toward the center of the drive shaft to concentrate a magnetic field toward the sensor.

A distal end of the sensor is curved.

In another aspect of the present invention, a device for measuring a bending angle of a constant velocity joint of a drive shaft, may include an outer race provided at the drive shaft and having an opening part formed at one end thereof to receive an end of the drive shaft therein, a permanent magnet mounted on an outer peripheral surface of the drive shaft, and a sensor mounted on the outer race and interlocking with the permanent magnet to measure the bending angle between the drive shaft and the outer race.

The sensor is provided in plural.

The device may further include a controller connected to the sensor to analyze a size and a direction of the bending angle between the drive shaft and the outer race measured through the sensor.

The permanent magnet may have a distal end with a curved shape toward the sensor to concentrate a magnetic field toward the sensor.

A distal end of the sensor is curved.

In further another aspect of the present invention, a device for measuring a bending angle of a constant velocity joint of a drive shaft, may include an outer race provided at the drive shaft and having an opening part formed at one end thereof to receive a distal end of the drive shaft therein, a permanent magnet mounted in the outer race, and a sensor provided at the distal end of the drive shaft and interlocking with the permanent magnet to measure the bending angle between the drive shaft and the outer race.

The sensor is provided in plural.

The device may further include a controller connected to the sensor to analyze a size and a direction of the bending angle between the drive shaft and the outer race measured through the sensor.

A yoke is mounted in the permanent magnet to concentrate a magnetic field toward the sensor.

In another aspect of the present invention, a device for measuring a bending angle of a constant velocity joint of a drive shaft, may include an outer race provided at the drive shaft and having an opening part formed at one end thereof to receive a distal end of the drive shaft therein, a permanent magnet provided at the distal end of the drive shaft, and a sensor mounted in the outer race and interlocking with the permanent magnet to measure the bending angle between the drive shaft and the outer race.

The sensor is provided in plural.

The device may further include a controller connected to the sensor to analyze a size and a direction of the bending angle between the drive shaft and the outer race measured through the sensor.

A yoke is mounted in the permanent magnet to concentrate a magnetic field toward the sensor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
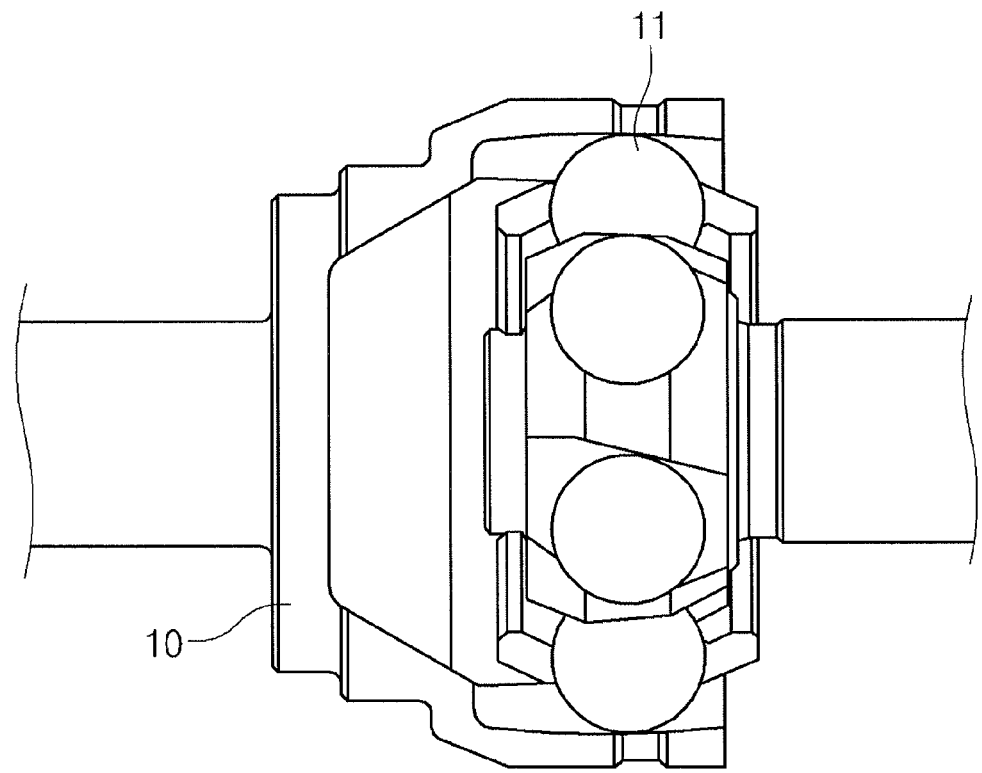
FIG. 1 is a view showing a joint structure of a drive shaft according to the related art.
Figure 2:
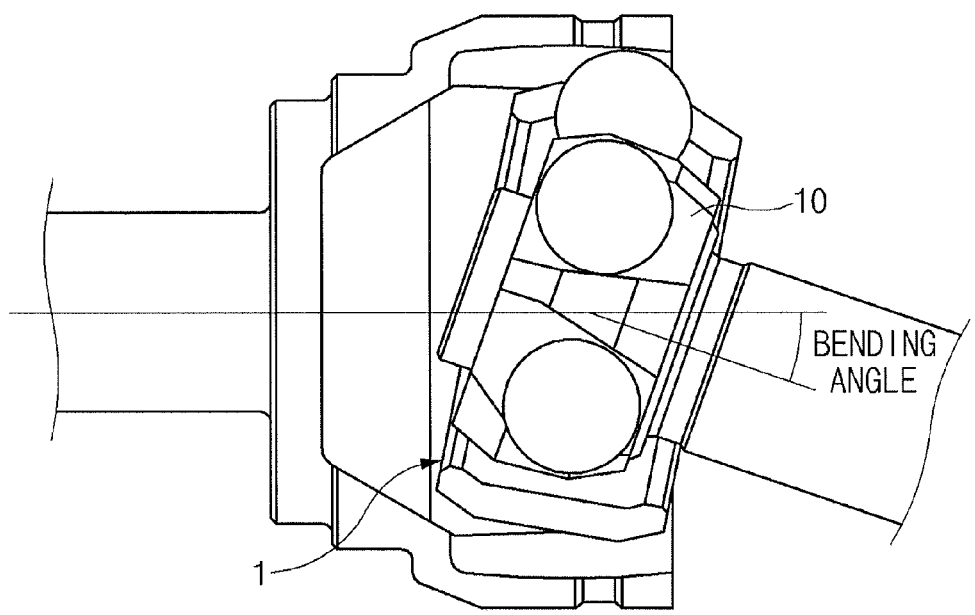
FIG. 2 is a view showing a bending angle state of the joint structure of the drive shaft according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
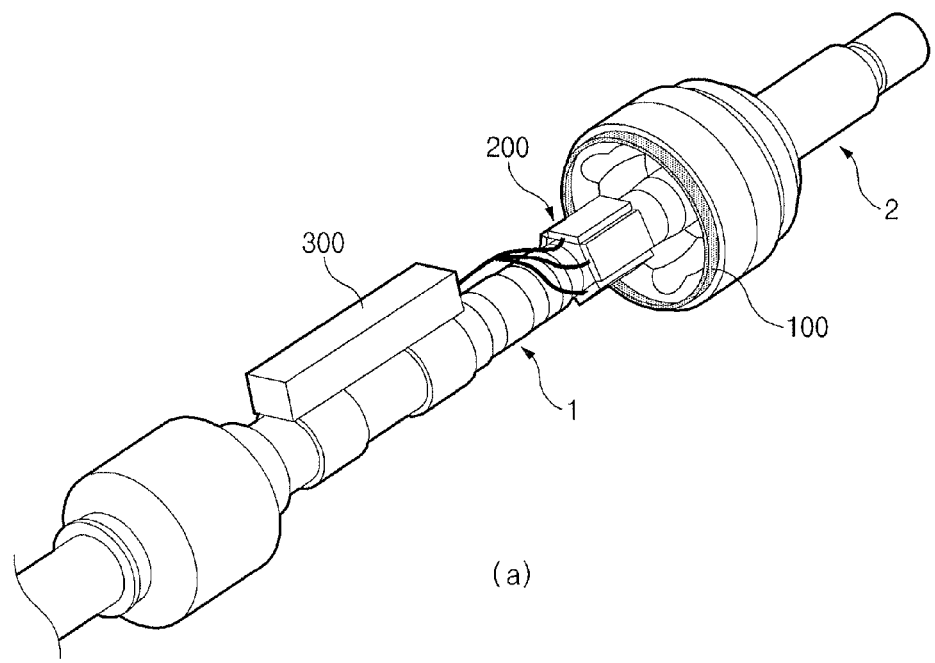
FIG. 3A is a view showing a device for measuring a bending angle of a constant velocity joint of a drive shaft according to a various exemplary embodiments of the present invention.
FIG. 3B is a view showing a drive shaft having mounted with a sensor in the device for measuring a bending angle of a constant velocity joint of a drive shaft according to the various exemplary embodiments of the present invention.
Figure 3:
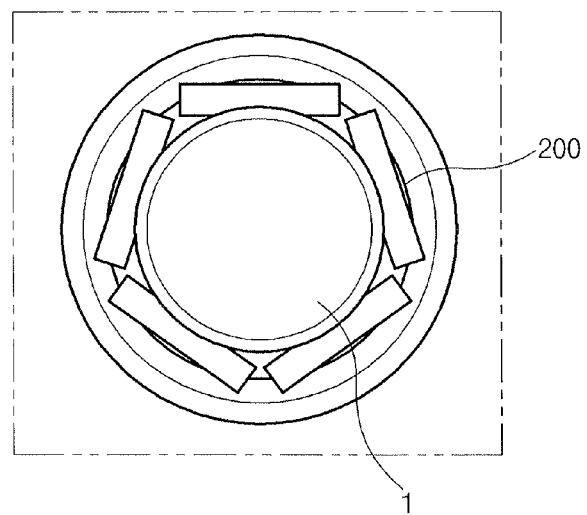
Figure 4:
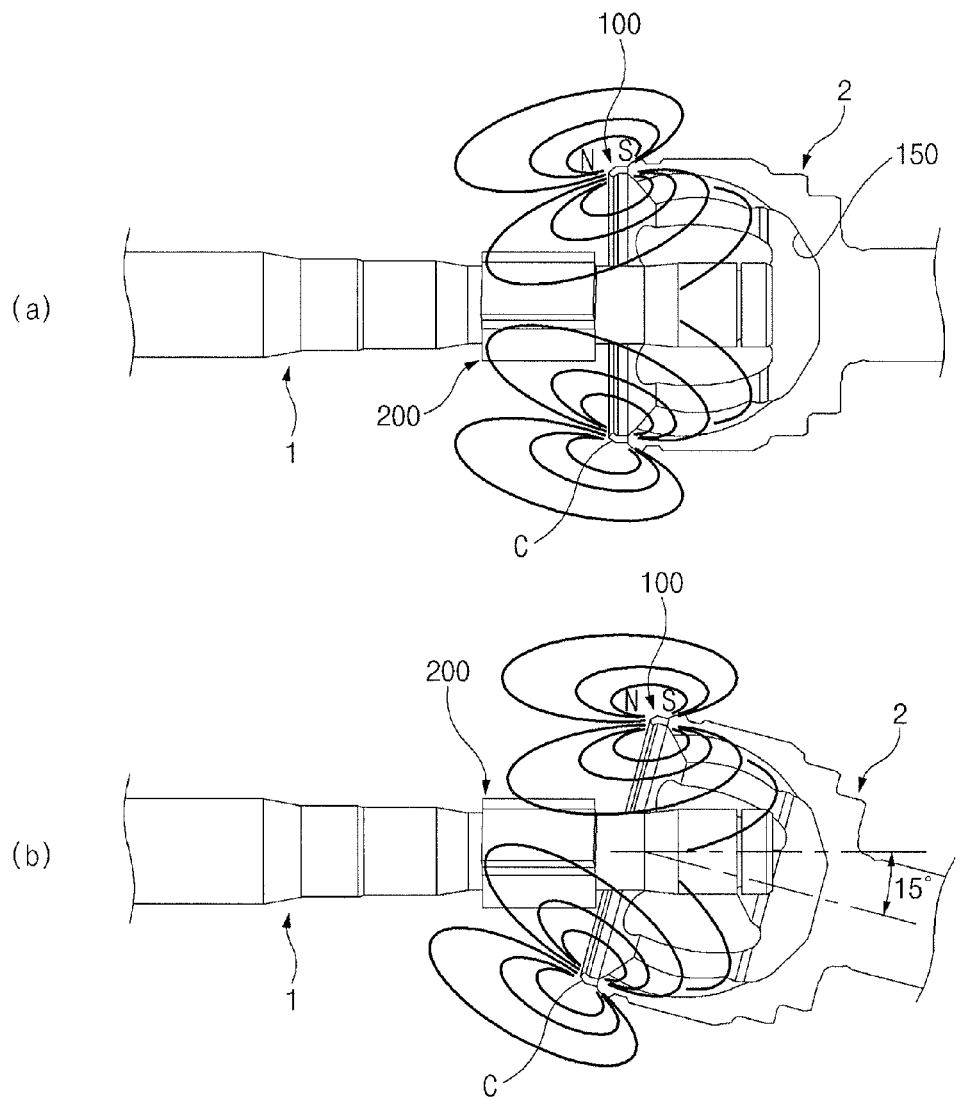
FIG. 4A is a view showing a state before a bending angle is generated in the device for measuring a bending angle of a constant velocity joint of a drive shaft according to the various exemplary embodiments of the present invention.
FIG. 4B is a view showing a state in which the bending angle is generated in the device for measuring a bending angle of a constant velocity joint of a drive shaft according to the various exemplary embodiments of the present invention.

FIGS. 3 to 8 are views showing a device for measuring a bending angle of a constant velocity joint of a drive shaft according to an exemplary embodiment of the present invention, wherein FIGS. 3A and 3B are views showing a device for measuring a bending angle of a constant velocity joint of a drive shaft according to a first exemplary embodiment of the present invention, and FIGS. 4A and 4B are view, respectively, showing states before and after a bending angle is generated in the device for measuring a bending angle of a constant velocity joint of a drive shaft according to the first exemplary embodiment of the present invention.

Figure 5:
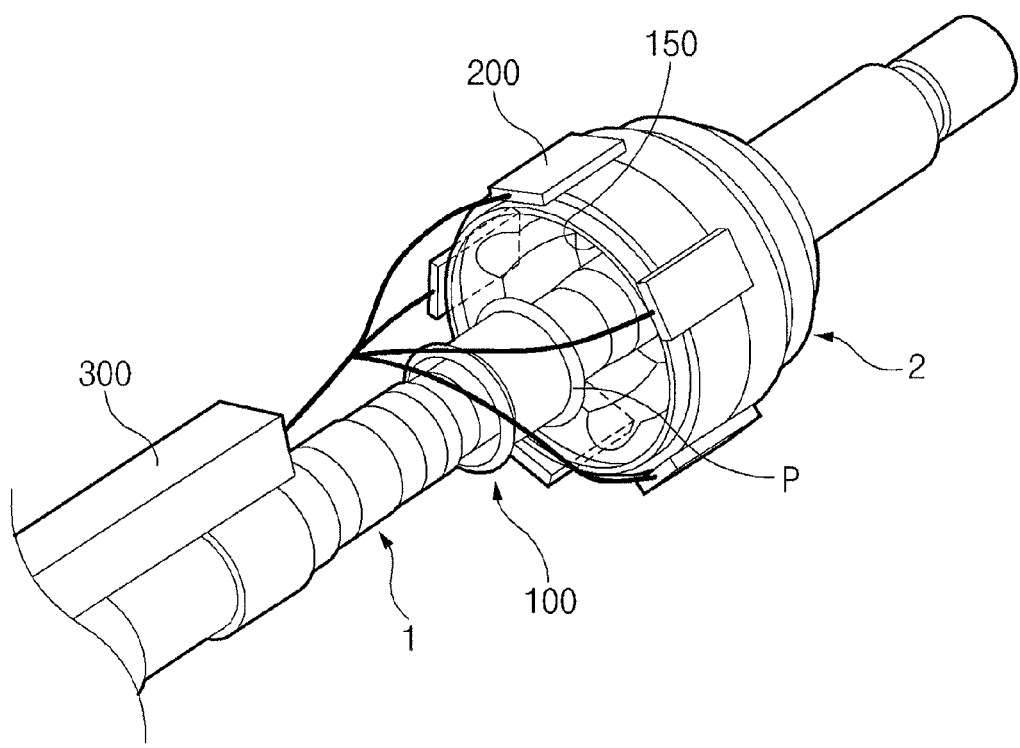
FIG. 5 is a view showing a device for measuring a bending angle of a constant velocity joint of a drive shaft according to a various exemplary embodiments of the present invention.
Figure 6:
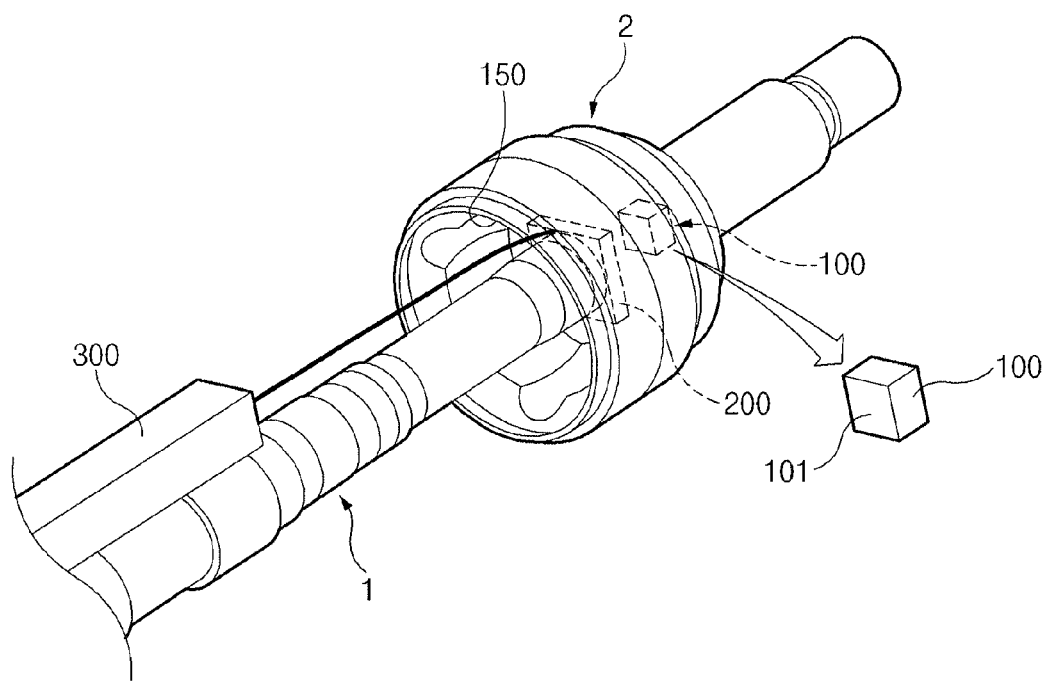
FIG. 6 is a view showing a device for measuring a bending angle of a constant velocity joint of a drive shaft according to a various exemplary embodiments of the present invention.
Figure 7:
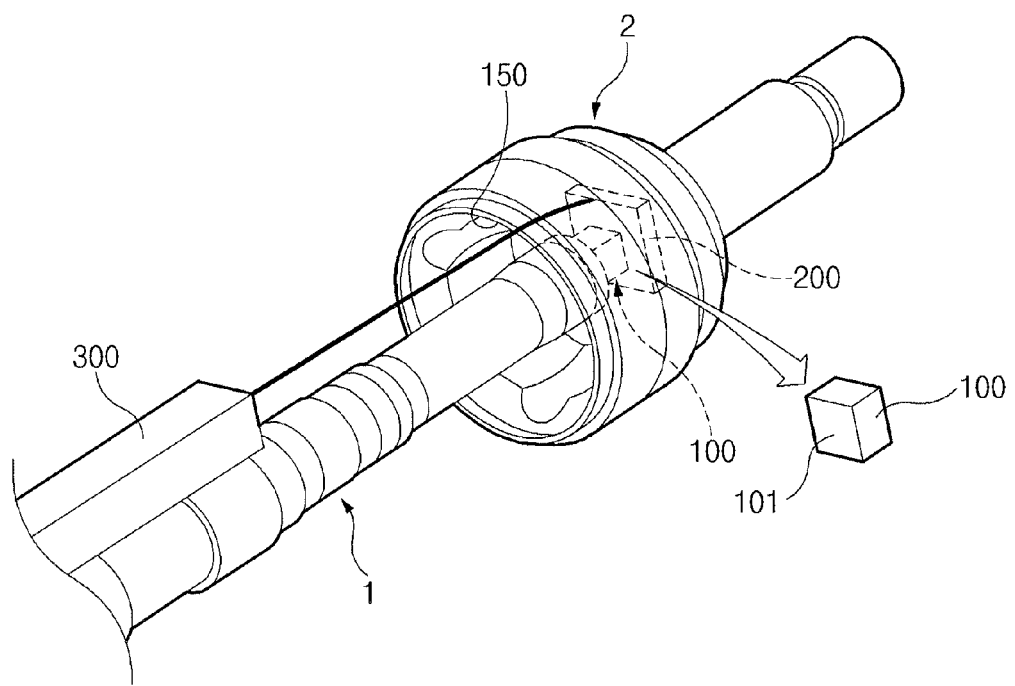
FIG. 7 is a view showing a device for measuring a bending angle of a constant velocity joint of a drive shaft according to a various exemplary embodiments of the present invention.
Figure 8:
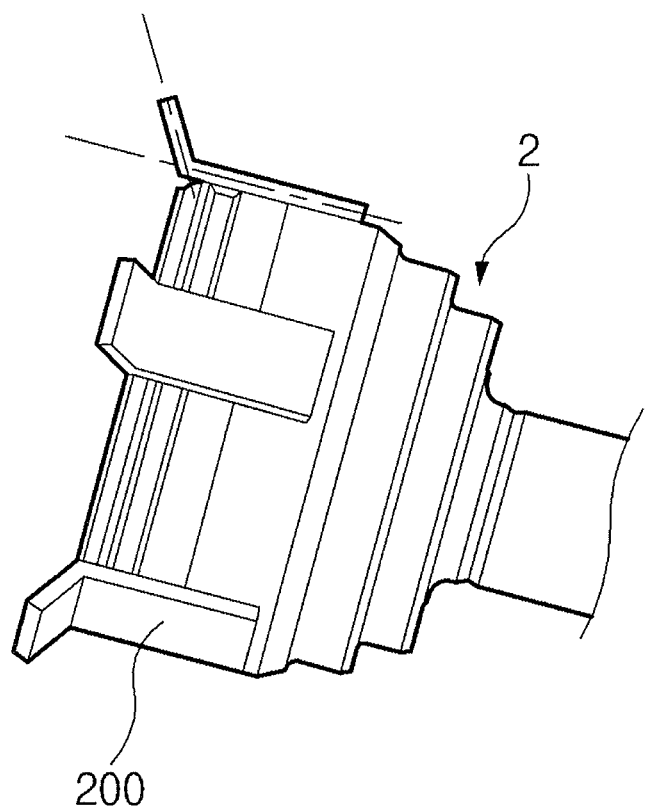
FIG. 8 is a view showing another example of a sensor in the device for measuring a bending angle of a constant velocity joint of a drive shaft according to an exemplary embodiment of the present invention.

In addition, FIG. 5 is a view showing a device for measuring a bending angle of a constant velocity joint of a drive shaft according to a second exemplary embodiment of the present invention, FIG. 6 is a view showing a device for measuring a bending angle of a constant velocity joint of a drive shaft according to a third exemplary embodiment of the present invention, FIG. 7 is a view showing a device for measuring a bending angle of a constant velocity joint of a drive shaft according to a fourth exemplary embodiment of the present invention, and FIG. 8 is a view showing another example of a sensor in the device for measuring a bending angle of a constant velocity joint of a drive shaft according to an exemplary embodiment of the present invention.

Exemplary embodiments of the present invention will be described in detail with reference to the accompanying drawings.

A device for measuring a bending angle of a constant velocity joint of a drive shaft according to an exemplary embodiment of the present invention is configured to include a drive shaft 1, an outer race 2 mounted at the drive shaft 1, and a permanent magnet 100 and a sensor 200 provided at the drive shaft 1 or the outer race 2, as shown in FIGS. 3 to 8, thereby making it possible to measure a size and a direction of a bending angle between the driving shaft 1 and the outer race 2 using a change in a magnetic field generated between the permanent magnet 100 and the sensor 200.

Hereinafter, each component of the device for measuring a bending angle of a constant velocity joint of a drive shaft according to an exemplary embodiment of the present invention will be described with reference to the accompanying drawings.

A device for measuring a bending angle of a constant velocity joint of a drive shaft 1 according to a first exemplary embodiment of the present invention is configured to include a drive shaft 1, an outer race 2 mounted at the drive shaft 1, a permanent magnet 100 provided in outer race 2, and a sensor 200 provided on the drive shaft 1, as shown in FIGS. 3 and 4.

The drive shaft 1 has a bar shape and connects wheels of a vehicle to each other.

The outer race 2 is mounted at a distal end of the drive shaft 1 and has an opening part 150 formed at one end thereof so that the drive shaft 1 may be inserted thereinto.

The permanent magnet 100 is mounted in the opening part 150 of the outer race 2.

The sensor 200 is provided on an outer peripheral surface of the drive shaft 1 and interlocks with the permanent magnet 100 mounted in the outer race 2 to measure a bending angle of the drive shaft 1 and the outer race 2.

Here, one sensor or several sensors 200 are provided on the outer peripheral surface of the drive shaft 1, and the permanent magnet 100 is provided over the entire outer peripheral surface of the opening part 150 of the outer race 2. Therefore, a change in a magnetic field generated by the permanent magnet 100 according to generation of the bending angle is measured through the sensor 200, thereby making it possible to sense a size and a direction of the bending angle between the drive shaft 1 and the outer race 2 in all directions.

A controller 300 is provided on the drive shaft 1 and is connected to the sensor 200 to supply electrical power to the sensor 200 or receive an output of the sensor 200, thereby making it possible to store and analyze the size and the direction of the bending angle generated between the drive shaft 1 and the outer race 2.

Here, as shown in FIG. 4, a distal end of the permanent magnet 100 has a curved chamfer C shape to have an angle toward the center of the drive shaft 1. Therefore, a direction of a magnetic field is changed toward the sensor 200 installed on an outer peripheral surface of the drive shaft 1 having a simple ring shape to concentrate a magnetic force line toward the sensor 200, thereby making it possible to improve precision in measurement of the bending angle.

Here, a distal end of the sensor 200 may be curved so as to correspond to the permanent magnet 100.

Meanwhile, according to a second exemplary embodiment of the present invention, as shown in FIG. 5, the permanent magnet 100 is mounted on the outer peripheral surface of the drive shaft 1, and the sensor 200 is mounted on the outer race 2 and interlocks with the permanent magnet 100, thereby making it possible to measure a bending angle between the drive shaft 1 and the outer race 2.

Here, one sensor 200 or several sensors 200 are provided on the outer peripheral surface of the outer race 2, and the permanent magnet 100 is provided on the outer peripheral surface of the drive shaft 1. Therefore, a change in a magnetic field generated by the permanent magnet 100 according to generation of the bending angle is measured through the sensor 200, thereby making it possible to sense a size and a direction of the bending angle between the drive shaft 1 and the outer race 2 in all directions.

A controller 300 is provided on the drive shaft 1 and is connected to the sensor 200 to supply electrical power to the sensor 200 or receive an output of the sensor 200, thereby making it possible to store and analyze the size and the direction of the bending angle generated between the drive shaft 1 and the outer race 2.

Here, as shown in FIG. 5, a distal end of the permanent magnet 100 has a curved flange shape P to change a direction of a magnetic field toward the sensor 200 and thus concentrate a magnetic force line toward the sensor 200, thereby making it possible to improve precision in measurement of the bending angle.

Here, as shown in FIG. 8, a distal end of the sensor 200 may be curved so as to correspond to the permanent magnet 100.

Further, according to a third exemplary embodiment of the present invention, as shown in FIG. 6, the permanent magnet 100 is mounted in the outer race 2, and one sensor 200 or several sensors 200 are provided at a distal end of the drive shaft 1. Therefore, at the time of inserting the drive shaft 1 into the outer race 2, the sensor 200 provided at the distal end of the drive shaft 1 and the permanent magnet 100 provided in the outer race 2 interlock with each other, thereby making it possible to measure a bending angle between the drive shaft 1 and the outer race 2.

Here, a controller 300 is provided on the drive shaft 1 and is connected to the sensor 200 to supply electrical power to the sensor 200 or receive an output of the sensor 200, thereby making it possible to store and analyze the size and the direction of the bending angle generated between the drive shaft 1 and the outer race 2.

Here, a yoke 101 is mounted in the permanent magnet 100 to change a direction of a magnetic field toward the sensor 200 installed at the distal end of the drive shaft 1 and thus concentrate a magnetic force line toward the sensor 200, thereby making it possible to improve precision in measurement of the bending angle. Here, the yoke 101 which determines the direction of the magnetic field of the permanent magnet 100 may have a variable shape.

Meanwhile, according to a fourth exemplary embodiment of the present invention, as shown in FIG. 7, the permanent magnet 100 is mounted at a distal end of the drive shaft 1, and one sensor 200 or several sensors 200 are provided in the outer race 2. Therefore, at the time of inserting the drive shaft 1 into the outer race 2, the sensor 200 provided in the outer race 2 and the permanent magnet 100 provided at the distal end of the drive shaft 1 interlock with each other, thereby making it possible to measure a bending angle between the drive shaft 1 and the outer race 2.

Here, a controller 300 is provided on the drive shaft 1 and is connected to the sensor 200 to supply electrical power to the sensor 200 or receive an output of the sensor 200, thereby making it possible to store and analyze the size and the direction of the bending angle generated between the drive shaft 1 and the outer race 2.

Here, a yoke 101 is mounted in the permanent magnet 100 to change a direction of a magnetic field toward the sensor 200 installed at the outer race 2 and thus concentrate a magnetic force line toward the sensor 200, thereby making it possible to improve precision in measurement of the bending angle. Here, the yoke 101 which determines the direction of the magnetic field of the permanent magnet 100 may have a variable shape.

The device for measuring a bending angle of a constant velocity joint of a drive shaft according to an exemplary embodiment of the present invention configured as described above is configured to include the outer race provided at the drive shaft and having the opening part 150 formed at one end thereof, the permanent magnet mounted in the opening part 150 of the outer race, and the sensor provided on the outer peripheral surface of the drive shaft and interlocking with the permanent magnet to measure the bending angle between the drive shaft and the outer race, such that the size and the direction of the bending angle of the drive shaft are measured, thereby making it possible to improve marketability and stability of the vehicle.

As set forth above, according to the exemplary embodiments of the present invention, the size and the direction of the bending angle of the constant velocity joint of the drive shaft are measured, thereby making it possible to improve marketability and stability of the vehicle.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for measuring a bending angle of a constant velocity joint of a drive shaft, the device comprising:
    an outer race provided at the drive shaft and having an opening part formed at one end thereof to receive an end of the drive shaft therein;
    a permanent magnet mounted to the outer race in the opening part thereof;
    a plurality of sensors provided on an outer peripheral surface of the drive shaft and interlocking with the both ends of the permanent magnet to measure the bending angle between the drive shaft and the outer race; and
    a controller connected to the sensor to analyze a size end a direction of the bending angle between the dive shaft and the outer race measured through the sensor.

2. The device according to claim 1, wherein the permanent magnet has a distal end with a curved shape to have an angle toward the center of the drive shaft to concentrate a magnetic field toward the sensor.

3. The device according to claim 2, wherein the sensor includes a distal end that is curved so as to correspond to the curved shape of the permanent magnet.

* * * * *